US011632318B2

(12) United States Patent
Li et al.

(10) Patent No.: US 11,632,318 B2
(45) Date of Patent: *Apr. 18, 2023

(54) JITTER BUFFER CONTROL BASED ON MONITORING OF DELAY JITTER AND CONVERSATIONAL DYNAMICS

(71) Applicant: DOLBY LABORATORIES LICENSING CORPORATION, San Francisco, CA (US)

(72) Inventors: Kai Li, Beijing (CN); Xuejing Sun, Beijing (CN); Gary Spittle, Hillsborough, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/988,571

(22) Filed: Aug. 7, 2020

(65) Prior Publication Data

US 2021/0029009 A1 Jan. 28, 2021

Related U.S. Application Data

(63) Continuation of application No. 15/302,945, filed as application No. PCT/US2015/025078 on Apr. 9, 2015, now Pat. No. 10,742,531.
(Continued)

(30) Foreign Application Priority Data

Apr. 16, 2014 (CN) .......................... 201410152754.9

(51) Int. Cl.
*H04L 43/0852* (2022.01)
*H04L 65/80* (2022.01)
(Continued)

(52) U.S. Cl.
CPC .......... *H04L 43/0852* (2013.01); *G10L 15/08* (2013.01); *G10L 25/93* (2013.01);
(Continued)

(58) Field of Classification Search
CPC ....... H04J 1/16; H04W 52/02; H04L 43/0852; H04L 43/0894
See application file for complete search history.

(56) References Cited

U.S. PATENT DOCUMENTS 6,683,889 B1   1/2004   Shaffer
6,775,301 B1   8/2004   Kroll
(Continued)

FOREIGN PATENT DOCUMENTS

EP   3011692    4/2016
GB   2356523    5/2001

OTHER PUBLICATIONS

Barry, Sean "Video Streaming in UMTS/HSDPA Networks, QOS Improvements via Link Layer Buffer Management" University of Dublin, Trinity College, Sep. 2008, pp. 1-96.
(Continued)

*Primary Examiner* — Mahran Y Abu Roumi

(57) ABSTRACT

Some implementations involve analyzing audio packets received during a time interval that corresponds with a conversation analysis segment to determine network jitter dynamics data and conversational interactivity data. The network jitter dynamics data may provide an indication of jitter in a network that relays the audio data packets. The conversational interactivity data may provide an indication of interactivity between participants of a conversation represented by the audio data. A jitter buffer size may be controlled according to the network jitter dynamics data and the conversational interactivity data. The time interval may include a plurality of talkspurts.

16 Claims, 7 Drawing Sheets

Related U.S. Application Data

(60) Provisional application No. 61/989,340, filed on May 6, 2014.

(51) Int. Cl.

| | | |
|---|---|---|
| *H04J 3/06* | (2006.01) | |
| *H04L 65/00* | (2022.01) | |
| *G10L 15/08* | (2006.01) | |
| *G10L 25/93* | (2013.01) | |
| *H04L 43/16* | (2022.01) | |
| *H04L 65/403* | (2022.01) | |
| *G10L 25/48* | (2013.01) | |
| *G10L 25/78* | (2013.01) | |

(52) U.S. Cl.
CPC ............... *H04J 3/06* (2013.01); *H04L 43/16* (2013.01); *H04L 65/00* (2013.01); *H04L 65/403* (2013.01); *H04L 65/80* (2013.01); *G10L 25/48* (2013.01); *G10L 25/78* (2013.01)

(56) References Cited

U.S. PATENT DOCUMENTS

| | | | |
|---|---|---|---|
| 7,079,486 B2 | 7/2006 | Colavito | |
| 7,170,545 B2 | 1/2007 | Rodman | |
| 7,170,901 B1 | 1/2007 | Katzur | |
| 7,246,057 B1* | 7/2007 | Sundqvist | H04L 12/6418 |
| | | | 704/503 |
| 7,359,324 B1 | 4/2008 | Ouellette | |
| 7,502,733 B2 | 3/2009 | Andrsen | |
| 7,697,447 B2 | 4/2010 | Harris | |
| 7,746,847 B2 | 6/2010 | Chitturi | |
| 7,787,500 B2 | 8/2010 | Tsuchinaga | |
| 7,852,882 B2 | 12/2010 | Jougit | |
| 7,881,284 B2 | 2/2011 | Lin | |
| 8,149,884 B2 | 4/2012 | Teramoto | |
| 8,254,376 B2 | 8/2012 | Mahkonen | |
| 8,472,320 B2 | 6/2013 | Enstrom | |
| 2003/0043856 A1* | 3/2003 | Lakaniemi | H04J 3/0632 |
| | | | 370/503 |
| 2003/0112758 A1 | 6/2003 | Pang | |
| 2003/0115320 A1* | 6/2003 | Yarroll | G10L 25/69 |
| | | | 709/224 |
| 2004/0066751 A1* | 4/2004 | Tseng | H04L 65/80 |
| | | | 370/252 |
| 2004/0120308 A1* | 6/2004 | LeBlanc | H04M 9/082 |
| | | | 370/352 |
| 2008/0240004 A1* | 10/2008 | Shaffer | H04J 3/0632 |
| | | | 370/296 |
| 2009/0003369 A1 | 1/2009 | Lundin | |
| 2010/0265834 A1* | 10/2010 | Michaelis | H04L 65/1069 |
| | | | 370/252 |
| 2010/0315960 A1 | 12/2010 | Li | |
| 2011/0010625 A1 | 1/2011 | Pettersson | |
| 2011/0044200 A1 | 2/2011 | Kulyk | |
| 2011/0310750 A1* | 12/2011 | Lundsgaard | H04L 65/80 |
| | | | 370/252 |
| 2012/0013937 A1* | 1/2012 | Ashmore | H04L 47/28 |
| | | | 358/1.15 |
| 2012/0123774 A1* | 5/2012 | Choi | H04L 49/90 |
| | | | 704/E21.002 |
| 2012/0203491 A1 | 8/2012 | Sun | |
| 2012/0245929 A1* | 9/2012 | Shibuya | A63F 13/358 |
| | | | 704/211 |
| 2014/0072000 A1* | 3/2014 | Shiva | H04J 3/0632 |
| | | | 370/516 |
| 2015/0332704 A1* | 11/2015 | Sun | H04B 3/23 |
| | | | 704/227 |
| 2015/0350099 A1* | 12/2015 | Sun | H04L 47/283 |
| | | | 370/412 |

OTHER PUBLICATIONS

Chen, Hua-Ching et al "VoWLAN Simulations through Novel Playout Buffer Algorithm" Apr. 2, 2013, Journal of Computers, vol. 24, No. 1, pp. 1-13.

Dandass, Y. "Streaming Real-Time Audio" Jan. 2001, windows Developers Journal, vol. 12, No. 1, pp. 26-43.

Gournay, P. et al "Improved Packet Loss Recovery Using Late Frames for Prediction-Based Speech Coders" IEEE International Conference on Acoustics, Speech, and Signal Processing, Apr. 6-10, 2003, pp. I-108-I-111.

ITU-T Recommendation p. 59 "Artificial Conversational Speech" Mar. 1993, pp. 1-8.

Liang, Y.J. et al. "Adaptive Playout Scheduling Using Time-Scale Modification in Packet Voice Communications" IEEE International Conference on Acoustics, Speech, and Signal Processing, May 7-11, 2001, pp. 1445-1448.

Moon, S.B. et al "Packet Audio Playout Delay Adjustment: Performance Bounds and Algorithms" Multimedia Systems Springer-Verlag 1998 No. 6, pp. 17-28.

Oklander, B. et al "Jitter Buffer Analysis" IEEE Proc. of the 17th Internal Conference on Computer Communications and Networks, Aug. 3-7, 2008, pp. 1-6.

* cited by examiner

JITTER BUFFER CONTROL BASED ON MONITORING OF DELAY JITTER AND CONVERSATIONAL DYNAMICS

CROSS-REFERENCE TO RELATED APPLICATIONS

This application is a continuation of U.S. patent application Ser. No. 15/302,945, filed Oct. 7, 2016, which is the 371 national stage of PCT Application No. PCT/US2015/025078, filed Apr. 9, 2015, which claims priority to Chinese Patent Application No. 201410152754.9, filed Apr. 16, 2014 and U.S. Provisional Patent Application No. 61/989,340, filed May 6, 2014, each of which is hereby incorporated by reference in its entirety.

TECHNICAL FIELD

This disclosure relates to the processing of audio signals. In particular, this disclosure relates to processing audio signals for telecommunications, including but not limited to processing audio signals for teleconferencing or video conferencing.

BACKGROUND

Voice transmission over packet networks is subject to delay variation, commonly known as jitter. Jitter may, for example, be measured in terms of inter-arrival time (IAT) variation or packet delay variation (PDV). IAT variation may be measured according to the receive time difference of adjacent packets. PDV may, for example, be measured by reference to time intervals from a datum or "anchor" packet receive time. In Internet Protocol (IP)-based networks, a fixed delay can be attributed to algorithmic, processing and propagation delays due to material and distance, whereas a variable delay may be caused by the fluctuation of IP network traffic, different transmission paths over the Internet, etc.

VoIP (voice over Internet Protocol) receivers generally rely on a "jitter buffer" to counter the negative impact of jitter. By introducing an additional delay between the time a packet of audio data is received and the time that the packet is reproduced, a jitter buffer aims at transforming the uneven flow of arriving packets into a regular flow of packets, such that delay variations will not cause perceptual sound quality degradation to the end users. Voice communication is highly delay sensitive. According to ITU Recommendation G.114, for example, one-way delay should be kept below 150 ms for normal conversation, with above 400 ms being considered unacceptable. Therefore, the additional delay added by a jitter buffer needs to be small enough to avoid causing perceptual sound quality degradation. Unfortunately, a small jitter buffer will lead to more frequent packet loss when packets arrive later than expected due to network delays.

SUMMARY

According to some implementations described herein, a method may involve receiving audio data. The audio data may include audio packets received at actual packet arrival times during a time interval, which may correspond with a conversation analysis segment. The conversation analysis segment may include a plurality of talkspurts. The method may involve analyzing the audio data of the conversation analysis segment to determine network jitter dynamics data and conversational interactivity data. The network jitter dynamics data may provide an indication of jitter in a network that relays the audio data packets. The conversational interactivity data may provide an indication of interactivity between participants of a conversation represented by the audio data. The method may involve controlling a jitter buffer size according to both the network jitter dynamics data and the conversational interactivity data.

Analyzing the audio data to determine the network jitter dynamics data may involve determining at least one of packet delay variation (PDV) or inter-arrival time (IAT) variation based, at least in part, on the actual packet arrival times. Determining PDV may involve comparing expected packet arrival times with the actual packet arrival times.

According to some implementations, analyzing the audio data may involve determining percentile ranges of packet delay times. Determining the network jitter dynamics data may involve determining an inter-percentile range of packet delay corresponding to a difference between a first packet delay time of a first percentile range and a second packet delay time of a second percentile range. In some examples, analyzing the audio data may involve determining a range of packet delay times according to order statistics of packet delay variation. The range of packet delay times may include shortest packet delay times, median packet delay times and longest packet delay times. Determining the network jitter dynamics data may involve determining a difference between one of the largest packet delay times and one of the median packet delay times. In some implementations, analyzing the audio data to determine the network jitter dynamics data may involve determining a delay spike presence probability and/or a delay spike intensity.

In some examples, analyzing the audio data to determine the conversational interactivity data may involve determining single-talk times during which only a single conversational participant may be speaking, double-talk times during which two or more conversational participants may be speaking and mutual silent times during which no conversational participant may be speaking. Analyzing the audio data to determine the conversational interactivity data may involve determining at least one of a rate of speaker alternation or a speaker interruption rate.

Some methods may involve receiving a speaker mute indication and/or a presentation indication. Determining the conversational interactivity data may involve determining conversational interactivity according to at least one of the speaker mute indication or the presentation indication.

In some implementations, analyzing the audio data to determine the conversational interactivity data may involve determining a conversational interactivity measure (CIM). The CIM may, for examples, be based heuristic rules and/or conversational relative entropy.

For example, the CIM may be based, at least in part, on heuristic rules that involve the application of a threshold for a rate of speaker alternation, a threshold for single-talk times during which only a single conversational participant may be speaking, a threshold for double-talk times during which two or more conversational participants may be speaking and/or a threshold for mutual silent times during which no conversational participant may be speaking.

In some implementations, the CIM may be based at least in part on conversational relative entropy. The conversational relative entropy may be determined, at least in part, according to probabilities of conversational states. The conversational states may include the probabilities of single-talk times during which only a single conversational participant may be speaking, of double-talk times during which two or more conversational participants may be speaking and mutual silent times during which no conversational participant may be speaking.

According to some implementations, determining the conversational interactivity data may involve analyzing the conversational activity of only a single conversational participant. For example, analyzing the conversational activity of the single conversational participant may involve determining whether the single conversational participant is talking or not talking. Controlling the jitter buffer size may involve setting the jitter buffer to a relatively smaller size when the single conversational participant is talking and setting the jitter buffer to a relatively larger size when the single conversational participant is not talking.

In some implementations, controlling the jitter buffer size may involve setting a jitter buffer to a relatively larger size when the network jitter dynamics data indicates more than a threshold amount of network jitter. For example, controlling the jitter buffer size may involve setting a jitter buffer for a first conversational participant to a relatively larger size when the network jitter dynamics data indicates more than a threshold amount of network jitter or when the conversational interactivity data indicates less than a threshold amount of conversational participation by the first conversational participant.

According to some implementations, controlling the jitter buffer size may involve setting a jitter buffer to a relatively smaller size when the network jitter dynamics data indicates less than a threshold amount of network jitter or when the conversational interactivity data indicates at least a threshold amount of conversational interactivity. In some examples, controlling the jitter buffer size may involve setting a jitter buffer for a first conversational participant to a relatively smaller size when the network jitter dynamics data indicates less than a threshold amount of network jitter or when the conversational interactivity data indicates at least a threshold amount of conversational participation by the first conversational participant. In some examples, controlling the jitter buffer size may involve assigning a relatively smaller weighting to the network jitter dynamics data and assigning a relatively larger weighting to the conversational interactivity data.

According to some implementations, controlling the jitter buffer size may involve setting a jitter buffer size according to one of at least three jitter buffer control modes. For example, the jitter buffer control modes may include a peak mode, a low-loss mode and a normal mode. In some such implementations, each jitter buffer control mode may correspond to a jitter buffer size. However, in some examples, each jitter buffer control mode may correspond to a range of jitter buffer sizes.

At least one of the jitter buffer control modes may correspond to network jitter dynamics data indicating at least a threshold amount of network jitter and conversational interactivity data indicating at least a threshold amount of conversational interactivity. At least one of the jitter buffer control modes may correspond to network jitter dynamics data indicating at least a threshold amount of network jitter and conversational interactivity data indicating less than a threshold amount of conversational interactivity. At least one of the jitter buffer control modes may correspond to network jitter dynamics data indicating less than a threshold amount of network jitter and conversational interactivity data indicating at least a threshold amount of conversational interactivity. At least one of the jitter buffer control modes may correspond to network jitter dynamics data indicating less than a threshold amount of network jitter and conversational interactivity data indicating less than a threshold amount of conversational interactivity.

According to some implementations, these methods and/or other methods disclosed herein may be implemented via one or more non-transitory media having software stored thereon. The software may include instructions for controlling one or more devices to perform such methods, at least in part.

At least some aspects of the present disclosure may be implemented via apparatus. For example, one or more devices may be capable of performing, at least in part, the methods disclosed herein. In some implementations, an apparatus may include an interface system, a memory system that may include a jitter buffer, and a logic system. The logic system may be capable of receiving audio data via the interface system. The audio data may include audio packets received at actual packet arrival times during a time interval that may correspond with a conversation analysis segment.

The interface system may include a network interface, an interface between the logic system and the memory system and/or an external device interface. The logic system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components.

The logic system may be capable of analyzing the audio data of the conversation analysis segment to determine network jitter dynamics data and conversational interactivity data. The network jitter dynamics data may provide an indication of jitter in a network that relays the audio data packets. The conversational interactivity data may provide an indication of interactivity between participants of a conversation represented by the audio data. The logic system may be capable of controlling a jitter buffer size according to the network jitter dynamics data and the conversational interactivity data. The time interval may correspond with a conversation analysis segment that includes a plurality of talkspurts.

In some implementations, analyzing the audio data to determine the network jitter dynamics data may involve determining at least one of packet delay variation (PDV) or inter-arrival time (IAT) variation by comparing expected packet arrival times with the actual packet arrival times. In some examples, analyzing the audio data to determine the network jitter dynamics data may involve determining at least one of a delay spike presence probability or a delay spike intensity.

According to some implementations, analyzing the audio data to determine the conversational interactivity data may involve determining single-talk times during which only a single conversational participant may be speaking, double-talk times during which two or more conversational participants may be speaking and mutual silent times during which no conversational participant may be speaking. Analyzing the audio data to determine the conversational interactivity data may involve determining a conversational interactivity measure (CIM) based on at least one of heuristic rules or conversational relative entropy.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DESCRIPTION OF EXAMPLE EMBODIMENTS

Figure 1A:
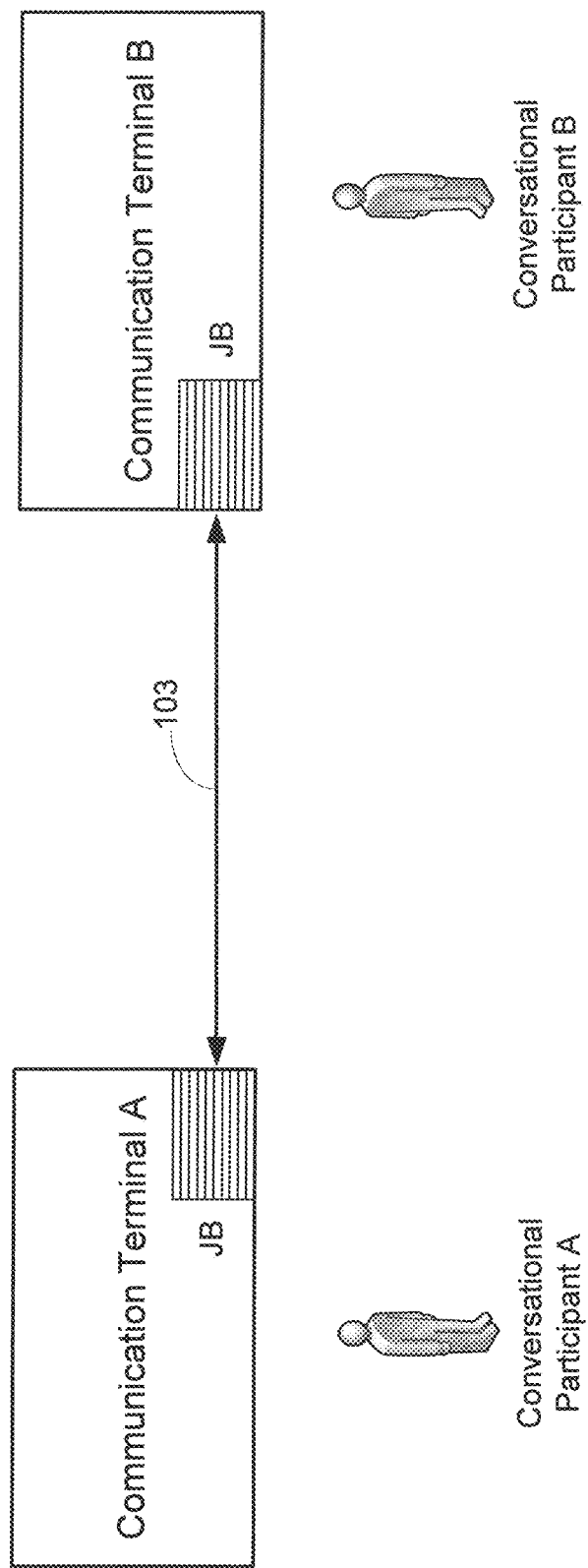
FIG. 1A is a diagram schematically illustrating an example of a voice communication system in which embodiments of the application can be applied.

The following description is directed to certain implementations for the purposes of describing some innovative aspects of this disclosure, as well as examples of contexts in which these innovative aspects may be implemented. However, the teachings herein can be applied in various different ways. For example, while various implementations are described in terms of particular examples of audio data processing, the teachings herein are widely applicable to other known audio data processing implementations, as well as audio data processing implementations that may be introduced in the future.

Moreover, the described embodiments may be implemented in a variety of hardware, software, firmware, etc. For example, aspects of the present application may be embodied in a system, in a device (e.g., a cellular telephone, a portable media player, a personal computer, a server, a television set-top box, a digital video recorder or other media player), a method or a computer program product. Accordingly, aspects of the present application may take the form of a hardware embodiment, a software embodiment (including firmware, resident software, microcodes, etc.) or an embodiment combining both software and hardware aspects. Such embodiments may be referred to herein as a "circuit," "module" or "system." Furthermore, aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

The terms "block" and "packet" are used synonymously herein. Accordingly, an "audio block" or a "block of audio data" will have the same meaning as an "audio packet" or a "packet of audio data."

As used herein, the term "buffer" may refer to a region of a physical memory device used to temporarily store data, or to a logical or virtual data buffer that "points" to a location in a physical memory. A "jitter buffer" will generally refer to a logical or a physical buffer for storing received audio frames. Although a jitter buffer will generally be used to temporarily store encoded audio data prior to a decoding process, a jitter buffer may store various forms of audio packets or audio frames, depending on the specific implementation. Therefore, throughout the specification, the term "jitter buffer" shall be construed as including both a jitter buffer actually storing (or pointing to) audio frames and a jitter buffer actually storing (or pointing to) various forms of packets (blocks) which will subsequently be decoded into audio frames before being played out or being fed into components for further processing. The decoding process may not always be explicitly discussed in connection with buffering processes, although decoding will generally be performed prior to reproduction or "playback" of the audio data. Accordingly, the term "frame" as used herein should be broadly construed as including a frame already decoded from a packet, a frame still encoded in a packet, a packet itself including one or more frames, or more than one frame encoded in a packet or already decoded from the packet. In other words, in the context of the present application, processing involving a frame may also be construed as processing involving a packet, or as processing involving simultaneously more than one frame contained in a packet.

In the context of the present application, the meaning of the expression "at the same time" (or the like) includes but is not limited to the exact literal meaning, and shall be construed as "within the same time gap/interval of a predefined granularity". In the present application, for example, the predefined granularity may be the time gap between two consecutively-sent frames/packets (such time gap may be referred to as frame gap), or network probing rate for checking packet arrivals, or processing time granularity, but is not limited thereto. For example, one may quantize the arrival time by frame duration/gap, e.g. 20 ms. Alternatively, or additionally, one may represent time as corresponding to an integer packet number. Similarly, in the context of the present application, when involving a specific time point, depending on the context it may also mean a time gap of the predefined granularity. Further, when involving a specific time $t_i$ (i is integer) for a certain frame where it shall be understood as a time point, assuming for clarity that it indicates the time point when the frame starts on the sender side, or indicates the time point when the reception of the frame starts on the receiver side.

As mentioned above, a jitter buffer can counter the negative impact of network instability by temporarily storing received packets of audio data (also referred to herein as "audio packets"), which may correspond to voice data. In some implementations, the jitter buffer may store audio packets before the audio packets are provided to a decoder and subsequently reproduced, e.g., by speakers of a communication terminal.

Determining a suitable jitter buffer size can be challenging. A jitter buffer that is too small may cause an unacceptable number of audio packets to be dropped, particularly during times of delay spikes that may be caused, e.g., by increased network activity. However, a jitter buffer that is too long may lead to perceptual delays. Certain conversations, such as interactive conversations between two or more people, may require a relatively lower delay in order to avoid irritating the participants in a conversation. However, participants in other conversations, such as a presentation that is predominantly a one-way conversation, are generally more tolerant of an initial delay.

Accordingly, in some implementations described herein, a jitter buffer size may be controlled in order to treat these two types of conversations differently. Some such implementations provide context-aware jitter buffer management capable of dynamically controlling a jitter buffer's size based on network jitter dynamics data corresponding to the long-term network jitter context.

FIG. 1A is a diagram schematically illustrating an example of a voice communication system in which embodiments of the application can be applied. As illustrated in FIG. 1A, conversational participant A operates a communication terminal A, and conversational participant B operates a communication terminal B. Like other communication terminals shown and described herein, communication terminals A and B may, for example, include telephones, personal computers, mobile electronic devices (e.g., cellular telephones, smart phones, tablets, etc.) or the like. Communication terminals A and B may include components such as those described below (e.g., with reference to FIGS. 5 and 6).

During a voice communication session, such as a teleconference, conversational participant A and conversational participant B may talk to each other via their communication terminals A and B. In this example, the communication terminals A and B are capable of communicating via a data link 103. The data link 103 may be implemented as a point-to-point connection, as a communication network, etc.

In this example, communication terminals A and B are capable of performing VAD (Voice Activity Detection) on audio blocks of audio signals captured by one or more microphones. If a voice presence is detected in an audio block, corresponding processing (e.g., applying a gain suitable for voice data) may be performed on the audio block by a logic system of the communication terminal and the audio block may be transmitted to another conversational participant's communication terminal via the data link 103. If no voice presence is decided in an audio block, corresponding processing (e.g., applying a gain suitable for non-voice data) may be performed on the audio block by a logic system of the communication terminal and the audio block may be transmitted to another conversational participant's communication terminal via the data link 103.

In this example, communication terminals A and B are capable of indicating a silent time to the other conversational participant's communication terminal. As used herein, a "silent time" is a time during which a conversational participant is not speaking. During a "silent time," a conversational participant's communication terminal may detect non-speech sounds, such as ambient noise. Audio data corresponding to such sounds may be processed and may be transmitted to one or more other communication terminals. In some implementations, a silent time may be indicated by transmitting silent time metadata (e.g., by setting a corresponding flag or bit), whereas in other implementations a silent time may be indicated by transmitting nothing during the time period corresponding to an audio block. In some implementations, silent time metadata may correspond with a conversational participant's activation of a "mute" control of a communication terminal.

Figure 1B:
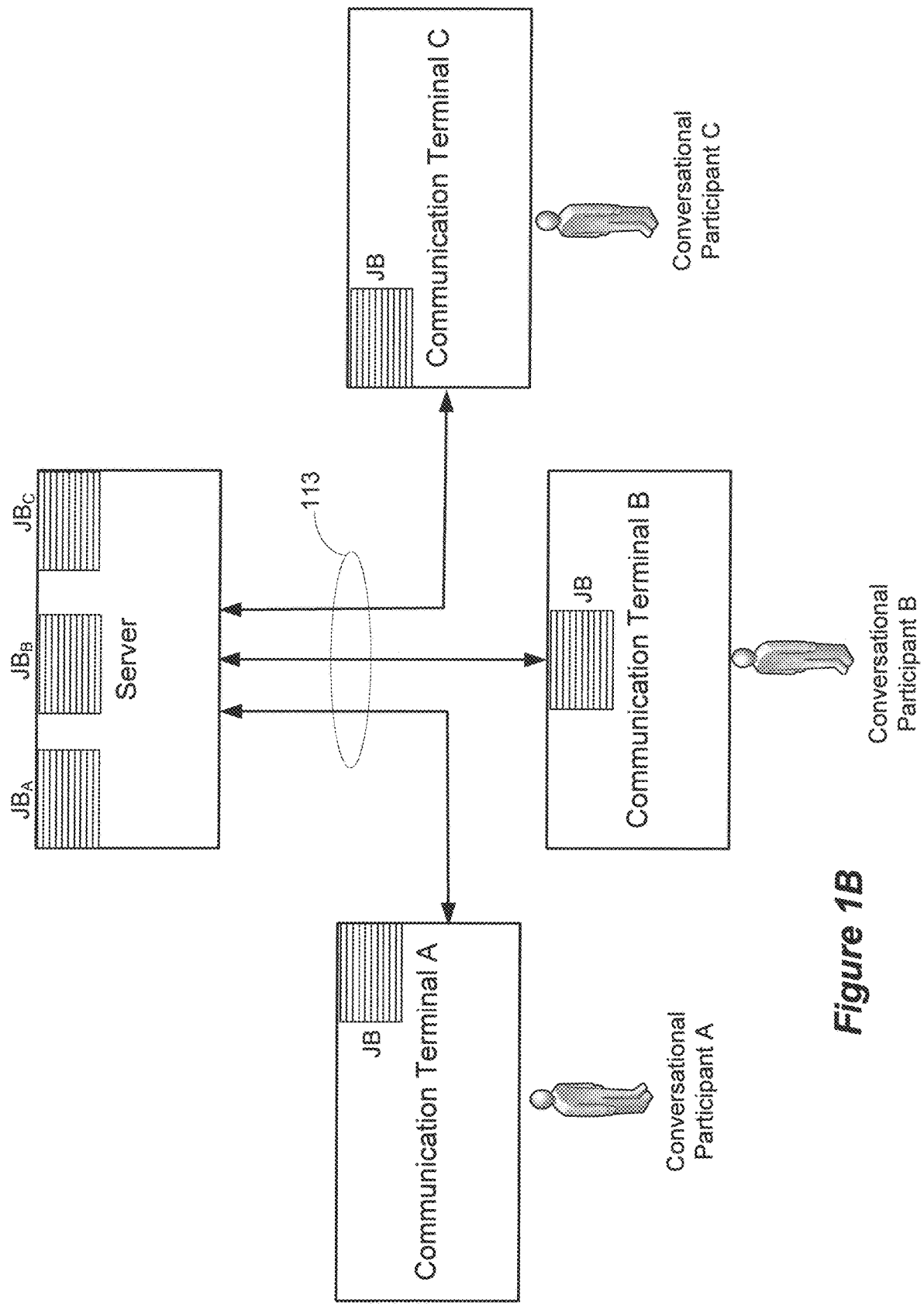
FIG. 1B is a diagram schematically illustrating another example of a voice communication system in which aspects of the application can be implemented.

In this implementation, communication terminals A and B are capable of establishing and controlling jitter buffers, which are represented as "JB" in FIGS. 1A and 1B. Here, communication terminals A and B are capable of receiving encoded audio data, e.g., as audio blocks, and storing them as entries in a jitter buffer. The entries may correspond to a time, e.g., a time at which the audio blocks are received. Audio blocks in the jitter buffer may be decoded and/or otherwise processed for reproduction by one or more speakers of the communication terminal. Reception of silent time metadata or nothing may cause corresponding empty entries in the jitter buffer. Communication terminals A and B may be capable of controlling a jitter buffer size as shown and described herein.

FIG. 1B is a diagram schematically illustrating another example of a voice communication system in which aspects of the application can be implemented. In this example, a voice conference may be conducted among conversational participants A, B and C.

As illustrated in FIG. 1B, conversational participant A operates a communication terminal A, conversational participant B operates a communication terminal B, and conversational participant C operates a communication terminal C. During a voice conference session, conversational participant A, conversational participant B, and conversational participant C may talk to each other through their communication terminals A, B, and C, respectively. The communication terminals illustrated in FIG. 1B may be capable of providing essentially the same functionality as those illustrated in FIG. 1A, from the perspective of conversational participants A, B and C. Although three communication terminals are illustrated in FIG. 1B, other implementations may involve more or fewer communication terminals.

However, in the example shown in FIG. 1B, the communication terminals A, B, and C are configured for communication with another device, which is a server in this example, through a common data link 113 or separate data links 113. The data link 113 may be implemented as a point-to-point connection or a communication network. The communication terminals A, B, and C may be capable of performing VAD and appropriate processing on audio blocks of the audio signal captured by the communication terminal, e.g., as described above.

In this implementation, communication terminals A, B and C are capable of indicating a silent time to the server. In some implementations, a silent time may be indicated by transmitting silent time metadata (e.g., by setting a corresponding flag or bit), whereas in other implementations a silent time may be indicated by transmitting nothing during the time period corresponding to an audio block. The communication terminals A, B and C may be capable of including a "timestamp" or similar time metadata with a transmitted audio packet, indicating the transmission time of the audio packet.

In this implementation, the server is also capable of establishing and controlling jitter buffers. In the example shown in FIG. 1B, the server has established jitter buffers $JB_A$, $JB_B$ and $JB_C$, corresponding to each of the communication terminals A, B and C. For example, the server may be capable of controlling a jitter buffer size as disclosed herein. In this implementation, the server is capable of receiving the audio blocks transmitted by the communication terminals A, B and C and of storing them to entries in the jitter buffers $JB_A$, $JB_B$ and $JB_C$ corresponding to the times of the audio blocks. For example, the server may be capable of storing the audio blocks to entries in the jitter buffers $JB_A$, $JB_B$ and $JB_C$ corresponding to timestamps of the audio blocks. Reception of the silent time metadata (or nothing) may cause corresponding empty entries in the jitter buffers.

In this example, the server is also capable of mixing audio blocks corresponding to the same time, from each of the jitter buffers $JB_A$, $JB_B$ and $JB_C$, into a mixed audio block. Copies of the mixed audio blocks may be transmitted to each of the communication terminals A, B, and C. The server may include one or more types of timestamps with each of the mixed audio blocks. In some instances, for example, communication terminals A and B may be sending audio packets to the server. The server may mix the audio packets (either in the time domain or the frequency domain) before sending the mixed packets to communication terminal C. Whether the server performs such mixing may depend on various factors, such as bandwidth, whether the server is configured for mixing, whether mono or multi-channel is desired for communication terminal C, etc.

Communication terminals A, B, and C are capable of establishing and controlling jitter buffers JB in this example. The communication terminals A, B, and C may receive the mixed audio blocks from the server and may store them to jitter buffer entries corresponding to the times of the mixed audio blocks. For example, the jitter buffer entries may correspond to a time at which the audio blocks are received. In each communication terminal, audio blocks in the jitter buffer may be decoded and reproduced by a speaker system of the communication terminal. Communication terminals A, B, and C may be capable of controlling a jitter buffer size as disclosed herein.

A jitter buffer may be used to transform an uneven flow of arriving audio packets into a regular flow of audio packets, such that delay variations will not cause perceptual quality degradation to conversational participants. Determining a suitable jitter buffer level generally involves a trade-off between average buffer delay and packet loss rate. Many statistic-based jitter buffer management (JBM) algorithms have been proposed, such as the inter-packet delay variation (IPDV) based JBM algorithms disclosed in United States Patent Publication No. 2009/0003369 and the histogram-based JBM algorithm disclosed in S. B. Moon, J. Kurose and D. Towsley, *Packet Audio Playout Delay Adjustment: Performance Bounds and Algorithms*, in Multimedia Systems (1998) 6:17-28.

However, the implementations disclosed herein provide alternative methods of jitter buffer control. Some implementations disclosed herein involve analyzing audio data to determine network jitter dynamics data and conversational interactivity data for context-aware jitter buffer control.

Figure 2:
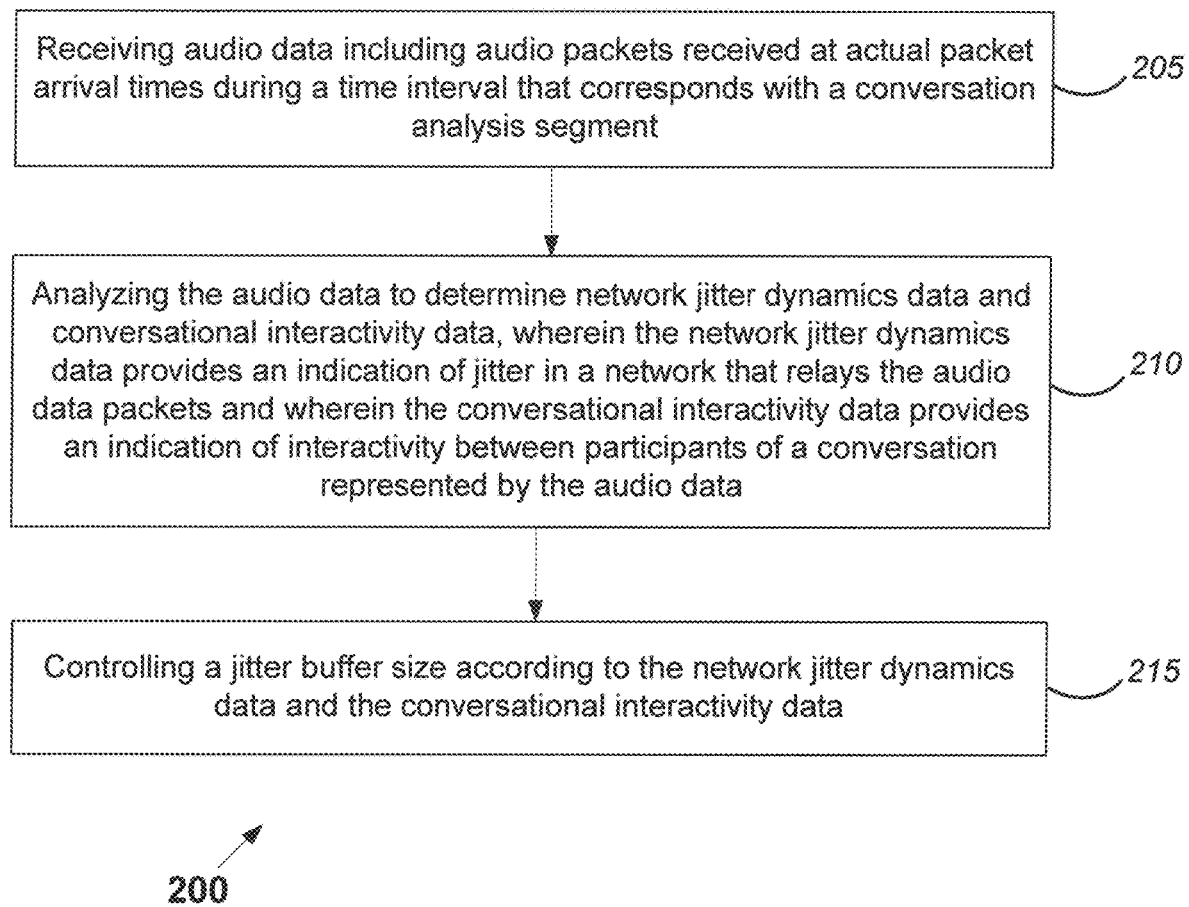
FIG. 2 is a flow diagram that illustrates blocks of some jitter butter control methods provided herein.

FIG. 2 is a flow diagram that illustrates blocks of some jitter butter control methods provided herein. Method 200 may, for example, be performed (at least in part) by a server or another such device that is configured for communicating with communication terminals, such as described above with reference to FIG. 1B. However, some methods provided herein may be performed (at least in part) by a communication terminal. As with other method described herein, the blocks of method 200 are not necessarily performed in the order indicated. Moreover, some implementations of method 200 (and other methods disclosed herein) may include more or fewer blocks than indicated or described.

In this example, method 200 begins with block 205, which involves receiving audio data during a time interval that corresponds with a conversation analysis segment. In this example, the audio data includes audio packets received at actual packet arrival times. The time interval may, for example, be a long-term or a short-term time interval that includes a plurality of talkspurts. As used herein, the term "talkspurt" corresponds to a continuous (or substantially continuous) segment of speech between "mutual silent times" of a conversation. Although audio packets corresponding to the mutual silent times may include background noise, etc., the term "mutual silent time" is used herein to mean a time during which no conversational participant is speaking. In some implementations, a packet or frame length may be on the order of tens of milliseconds (e.g., 20 ms) and a conversation analysis segment may be on the order of tens of seconds e.g., 20 seconds.

Here, block 210 involves analyzing the audio data of the conversation analysis segment to determine network jitter dynamics data and conversational interactivity data. The network jitter dynamics data may, for example, provide an indication of jitter in a network that relays the audio data packets. The conversational interactivity data may provide an indication of interactivity between participants of a conversation represented by the audio data. In this implementation, block 215 involves controlling a jitter buffer size according to both the network jitter dynamics data and the conversational interactivity data.

Analyzing the audio data to determine the network jitter dynamics data may involve determining at least one of packet delay variation (PDV) or inter-arrival time (IAT) variation based, at least in part, on the actual packet arrival times. The network jitter dynamics data may, for example, include an inter-percentile range of packet delay, a delay spike probability and/or a delay spike density. For example, in some implementations a PDV for a set number of packets may be determined as a difference between an actual packet arrival time and an expected packet arrival time.

For example, consider a conversation analysis segment consisting of M talkspurts and N audio packets. In this discussion, the following variables represent the corresponding quantities set forth below:

$t_k^i$ represents the sender timestamp of the i-th packet in the k-th talkspurt;

$r_k^i$ represents the receiver timestamp of the i-th packet in the k-th talkspurt;

$n_k$: number of received packets in the k-th talkspurt;

$p_k^i$ represents the playback timestamp of the i-th packet in the k-th talkspurt; and $p_k^i - t_k^i$ represents the playback delay.

In some implementations, an indication of late arrival may be made according to whether the playback timestamp indicates that time for reproduction/playback of the audio packet was earlier than the arrival time of the audio packet. For example, an indication of late arrival of an audio packet will be indicated in a binary form, such that an indication of late arrival is one or zero, e.g., as follows:

$$I_k^i = \begin{cases} 1, & \text{if } p_k^i < r_k^i \\ 0, & \text{otherwise} \end{cases} \quad \text{(Equation 1)}$$

In Equation 1, $I_k^i$ represents a late arrival indication for the i-th packet in the k-th talkspurt. However, in alternative implementations, a more granular late arrival indication may be used. For example, a late arrival indication may indicate a degree of lateness according to two or more time thresholds.

In some such implementations, a packet delay variation may be determined according to a time window that includes the past w audio packets that have been received, e.g., as follows:

$$\Delta d_n^{i-w+1}, \Delta d_n^{i-w+2}, \ldots, \Delta d_n^i. \quad \text{(Equation 2)}$$

In Equation 2, $\Delta d_n^i$ represents the packet delay of the i-th audio packet, $\Delta d_n^{i-w+1}$ represents the packet delay of an audio packet received (w+1) packets prior to the i-th audio packet, $\Delta d_n^{i-w+2}$ represents the packet delay of the next audio packet received, etc. The packet delay may, for example, be determined according to PDV or IAT. The value of w also may be referred to herein as an "analysis window length." The choice of w determines how fast a corresponding algorithm may adapt to delay variation. Accordingly, the value of w is subject to a trade-off between accuracy and responsiveness. In some implementations, w may be in the range of 200 to 1000.

According to some implementations, received audio packets may be sorted into a range of packet delay times, e.g., according to order statistics of packet delay variation. For example, order statistics for the above-referenced packet delay variations may be represented as $\Delta D^1, \Delta D^2 \ldots \Delta D^w$, wherein $\Delta D^1 \le \Delta D^2 \le \ldots \le \Delta D^w$. In this example, $\Delta D^1$ represents the smallest delay and $\Delta D^w$ represents the largest delay.

Accordingly, such a range may include shortest packet delay times, median packet delay times and longest packet delay times. Determining the network jitter dynamics data may involve determining a difference between the delay times, e.g., a difference between one of the largest packet delay times and one of the median packet delay times.

Some such implementations involve determining percentile ranges of packet delay times. In some such implementations, determining the network jitter dynamics data may involve determining an inter-percentile range of packet delay corresponding to a difference between a first packet delay time of a first percentile range (e.g., for one of the largest packet delay times) and a second packet delay time of a second percentile range (e.g., for one of the median packet delay times).

In some implementations, an inter-percentile range may be determined as follows:

$$\Delta D^r - \Delta D^\kappa \qquad \text{(Equation 3)}$$

In some implementations, r may be selected such that $\Delta D^r$ represents one of the largest packet delay times, whereas $\kappa$ may be selected such that $\Delta D^\kappa$ represents a delay time at or near the median of packet delay times. In one example, r and $\kappa$ may be determined as follows:

$$r = \text{round}(0.995 \times w) \text{ and } \kappa = \text{round}(0.5 \times w) \qquad \text{(Equations 4 and 5)}$$

In Equations 4 and 5, "round" represents a process of rounding to a whole number. In some implementations, the values of r and $\kappa$ may be determined according to empirical data based on experiments involving audio packets transmitted on different types of actual networks.

Determining the network jitter dynamics data may involve determining a delay spike intensity, e.g., based on the number of packets that had a delay beyond a threshold and the amount of delay for those packets, and/or determining a delay spike presence probability. For example, in some implementations, a delay spike presence probability may be determined as follows:

$$p = \frac{\sum_{i}^{w} I_n^i}{w} \qquad \text{(Equation 6)}$$

In Equation 6, p represents a delay spike presence probability and $I_n^i$ represents a delay spike indicator. In some examples, the delay spike indicator of Equation 6 may be determined as follows:

$$I_n^i = \begin{cases} 0, & \text{if } \Delta d_n^i < \xi_{th} \\ 1, & \text{otherwise} \end{cases} \qquad \text{(Equation 7)}$$

In Equation 7, $\xi_{th}$ represents a delay spike threshold. In some implementations, the delay spike threshold may be in the range of 5 to 20 packet intervals, e.g., 10 packet intervals. For example, if an expected time interval between packets is 20 ms., a delay spike threshold of 10 would correspond to 200 ms.

Some implementations may involve determining average delay spike intensity during a time interval. In some examples, the average delay spike intensity may be determined as follows:

$$\lambda = \frac{\sum_{i=1}^{w} I_n^i \Delta d_n^i}{\sum_{i=1}^{w} I_n^i} \qquad \text{(Equation 8)}$$

In Equation 8, $\lambda$ represents average delay spike intensity for an analysis window length of w audio packets.

Some implementations may involve combining more than one type of network jitter dynamics data. For example, some peak mode detection (PMD) implementations may involve combining more than one type of network jitter dynamics data in order to detect a peak mode of network jitter. In some examples, PMD will involve a "long-term" peak mode detection during a conversation analysis segment that includes a plurality of talkspurts.

In some examples, PMD may be based, at least in part, on inter-percentile range (IPR) calculations (e.g., as described above), delay spike intensity and/or delay spike presence probability. In one example, PMD is determined as follows:

$$PMD = f(IPR, p, \lambda) \qquad \text{(Equation 9)}$$

$$= \begin{cases} 1, & \text{if } (IPR > IPR\_th \;\&\&\; p > p\_th) \| \\ & (IPR > IPR\_th \;\&\&\; \lambda > \lambda\_th) \\ 0, & \text{otherwise} \end{cases}$$

In Equation 9, IPR_th represents a threshold of the inter-percentile range of order statistics, p_th represents a threshold of delay spike presence probability and $\lambda$_th represents a threshold of average delay spike intensity. In some implementations, IPR_th may be in the range of 5-9, e.g., 7. In some examples, p_th may be in the range of 0.03 to 0.07, e.g., 0.05, and $\lambda$_th may be in the range of 10-20, e.g., 15. Accordingly, in the example shown in Equation 9, a peak mode detection process will produce a binary value that corresponds to a "yes or no" determination. However, in alternative implementations, relatively more granular peak mode detection values may be determined. For example, in some implementations a range of two or more PMD values may correspond with varying degrees of network jitter.

As noted above, various implementations described herein involve controlling a jitter buffer size according to both network jitter dynamics data and conversational interactivity data. The foregoing discussion has focused mainly on determining various types of network jitter dynamics data. Following are various examples of determining conversational interactivity data.

Figure 3:
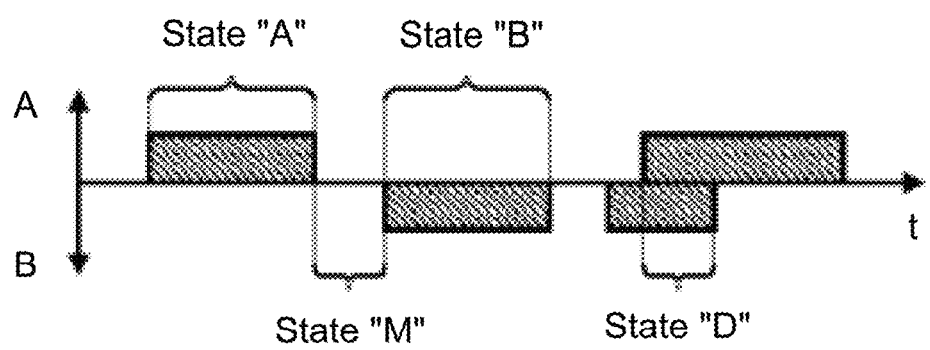
FIG. 3 provides an example of a two-party conversational model that provides some examples of conversational states.

In some implementations, determining conversational interactivity data may involve determining conversational states. FIG. 3 provides an example of a two-party conversational model that provides some examples of conversational states.

In FIG. 3, the shaded areas above the horizontal time axis t indicate times during which conversational participant "A" is talking, whereas the shaded areas below the time axis indicate times during which conversational participant "B" is talking. The areas labeled State A and State B indicate "single-talk" times during which a single conversational participant is speaking.

The area labeled State D indicates a "double-talk" time during which conversational participant A and conversational participant B are both speaking. In some instances, a conversation may include three or more participants. Accordingly, as used herein, a "double-talk" time means a time during which at least two conversational participants are speaking.

State M of FIG. 3 corresponds to a mutual silent time during which neither conversational participant A nor conversational participant B is speaking. In view of the fact that a conversation may sometimes include three or more participants, as used herein, a "mutual silent time" means a time during which no conversational participant is speaking.

However, determining conversational interactivity data may involve determining other types of conversational states. In some implementations, determining conversational interactivity data may involve determining at least one of speaker alternation rate or a speaker interruption rate. A successful interruption of conversational participant "A" by conversational participant "B" may, for example, be inferred by the sequence State A/State D/State B. An unsuccessful interruption of conversational participant "A" may, for example, be determined by a sequence State A/State D/State A. Some implementations may involve sending or receiving a speaker mute indication or a presentation indication, e.g., as metadata associated with the audio packets. For example, a speaker mute indication or a presentation indication may correspond with receipt of input from a conversational participant, such as pressing a "mute" button, entering a code corresponding to a speaker mute indication or a presentation indication (e.g., via a keyboard or key pad), etc. Determining the conversational interactivity data may be based, at least in part, on the speaker mute indication and/or the presentation indication.

In some implementations, analyzing the audio data to determine the conversational interactivity data may involve determining a conversational interactivity measure (CIM) that corresponds with a degree of conversational interactivity. In some implementations, the CIM may be based on heuristic rules and/or conversational relative entropy.

In some examples, the CIM may be based, at least in part, on heuristic rules that involve the application of at least one of a threshold for a rate of speaker alternation, a threshold for single-talk times during which only a single conversational participant is speaking, a threshold for double-talk times during which two or more conversational participants are speaking or a threshold for mutual silent times during which no conversational participant is speaking. For heuristic rules, the degree of conversational interactivity may be based on a number of packets corresponding to single-talk times, a number of packets corresponding to mutual silent times, a number of packets corresponding to double-talk times and/or a number of times the speakers change (which may be referred to herein as "speaker alternation") within a conversation analysis segment that includes a plurality of talkspurts.

In one such example, a CIM may be based on heuristic rules as follows:

$$CIM(k) = \begin{cases} 0, & \left(\frac{\lambda_A(k)}{\lambda_B(k)} \in [0, 1/\text{thresh\_ST}] \cup [\text{thresh\_ST}, +\infty)\right) \\ & (\lambda_M(k) >= \text{thresh\_MS}) \| (SAR(k) <= \text{thresh\_SAR}) \\ 1, & \text{otherwise} \end{cases}$$ (Equation 10)

In the example of Equation 10, CIM(k) represents a conversational interactivity measure in a kth conversation analysis segment, thresh_ST represents a threshold for single-talk times, thresh_MS represents a threshold for mutual silent times and thresh_SAR represents a threshold for speaker alternation. In some implementations, thresh_ST may be in the range of 8 to 12, e.g., 10. In some examples, thresh_MS may be in the range of 0.7-0.9 (e.g., 0.8) and thresh_SAR may be in the range of 0.003-0.007 (e.g., 0.005).

In the example shown in Equation 10, a conversational interactivity measure will be a binary value that may be thought of as corresponding to an "interactive" or "not interactive" determination. However, in alternative implementations, relatively more granular values of conversational interactivity may be determined. For example, in some implementations a range of two or more CIM values may correspond with varying degrees of conversational interactivity.

In some implementations wherein the CIM is based at least in part on conversational relative entropy, the conversational relative entropy may be based, at least in part, on probabilities of conversational states. In some examples, the conversational states may correspond with the probabilities of single-talk times, of double-talk times and of mutual silent times. In one such example, the relative entropy of a conversation involving conversational participant A and conversational participant B may be determined as follows:

$$E(k) = \sum_{I=\{A,B,M,D\}} -P_I(k)\log_2\left(\frac{P_I(k)}{Q_I(k)}\right)$$ (Equation 11)

In Equation 11, E(k) represents a conversational relative entropy-based CIM in a kth conversation analysis segment and $P_I(k)$ represents a probability of a conversational state in the kth conversation analysis segment. In this example, $P_A(k)$ represents the probability of a single-talk time for conversational participant A, $P_B(k)$ represents the probability of a single-talk time for conversational participant B, $P_M(k)$ represents the probability of a mutual silent time during which neither conversational participant is speaking and $P_D(k)$ represents the probability of a double-talk time during which both conversational participants are speaking.

In Equation 11, $Q_I(k)$ represents the probability of each state corresponding with a presentation mode. Determining the probability of a presentation mode may be based, at least in part, on the relative amount of time that a particular conversational participant is speaking, on the relative length of a conversational participant's talkspurts relative to the length of other conversational participants' talkspurts, etc. As noted above, some implementations may involve sending or receiving a speaker mute indication or a presentation indication, e.g., as metadata associated with the audio packets. Therefore, determining the probability of a presentation mode may be based, at least in part, on a speaker mute indication and/or a presentation indication.

In some examples, controlling a jitter buffer size according to network jitter dynamics data and conversational interactivity data (block 215 of FIG. 2) may involve setting a jitter buffer to a relatively larger size when the network jitter dynamics data indicates more than a threshold amount of network jitter and/or when the conversational interactivity data indicates less than a threshold amount of conversational interactivity. Block 215 may involve setting a jitter buffer to a relatively smaller size when the network jitter dynamics data indicates less than a threshold amount of network jitter and/or when the conversational interactivity data indicates at least a threshold amount of conversational interactivity. In some examples, block 215 may involve setting a jitter buffer to a relatively larger size when the network jitter dynamics data indicates more than a threshold amount of network jitter and/or when the conversational interactivity data indicates less than a threshold amount of conversational participation by a first conversational participant. In some examples, block 215 may involve setting a jitter buffer for the first conversational participant to a relatively smaller size when the network jitter dynamics data indicates less than a threshold amount of network jitter and/or when the conversational interactivity data indicates at least a threshold amount of conversational participation by the first conversational participant.

However, the network jitter dynamics data and the conversational interactivity data may or may not be given equal weight in the determination of jitter buffer size, depending on the implementation. In some implementations, for example, controlling the jitter buffer size according to both the network jitter dynamics data and the conversational interactivity data may involve assigning a relatively smaller weighting to the network jitter dynamics data and assigning a relatively larger weighting to the conversational interactivity data. For example, if the conversational interactivity data indicate that there is a high probability that a conversation is in a presentation mode, a relatively large jitter buffer size may be determined. Some implementations involve controlling a jitter buffer size according to one of at least three jitter buffer control modes, e.g., as described below. Each of the jitter buffer control modes may correspond to a jitter buffer size (or size range). In some implementations, a "small" jitter buffer size may be in the range of tens of milliseconds, e.g., 5 ms, 10 ms, 25 ms, 30 ms, 35 ms, 40 ms, 45 ms, 50 ms, 55 ms, etc. In some examples, a "large" jitter buffer size may be in the range of hundreds of milliseconds, e.g., 500 ms, 600 ms, 700 ms, 800 ms, 900 ms, 1000 ms, 1100 ms, 1200 ms, 1300 ms, 1400 ms, 1500 ms, etc. In some implementations, the jitter buffer size may be fixed until the network jitter dynamics data and/or the conversational interactivity data indicate a change in jitter buffer control mode. However, in other implementations, the jitter buffer size may vary adaptively within a size range during the operation of a single jitter buffer control mode, e.g., as discussed below.

Figure 4:
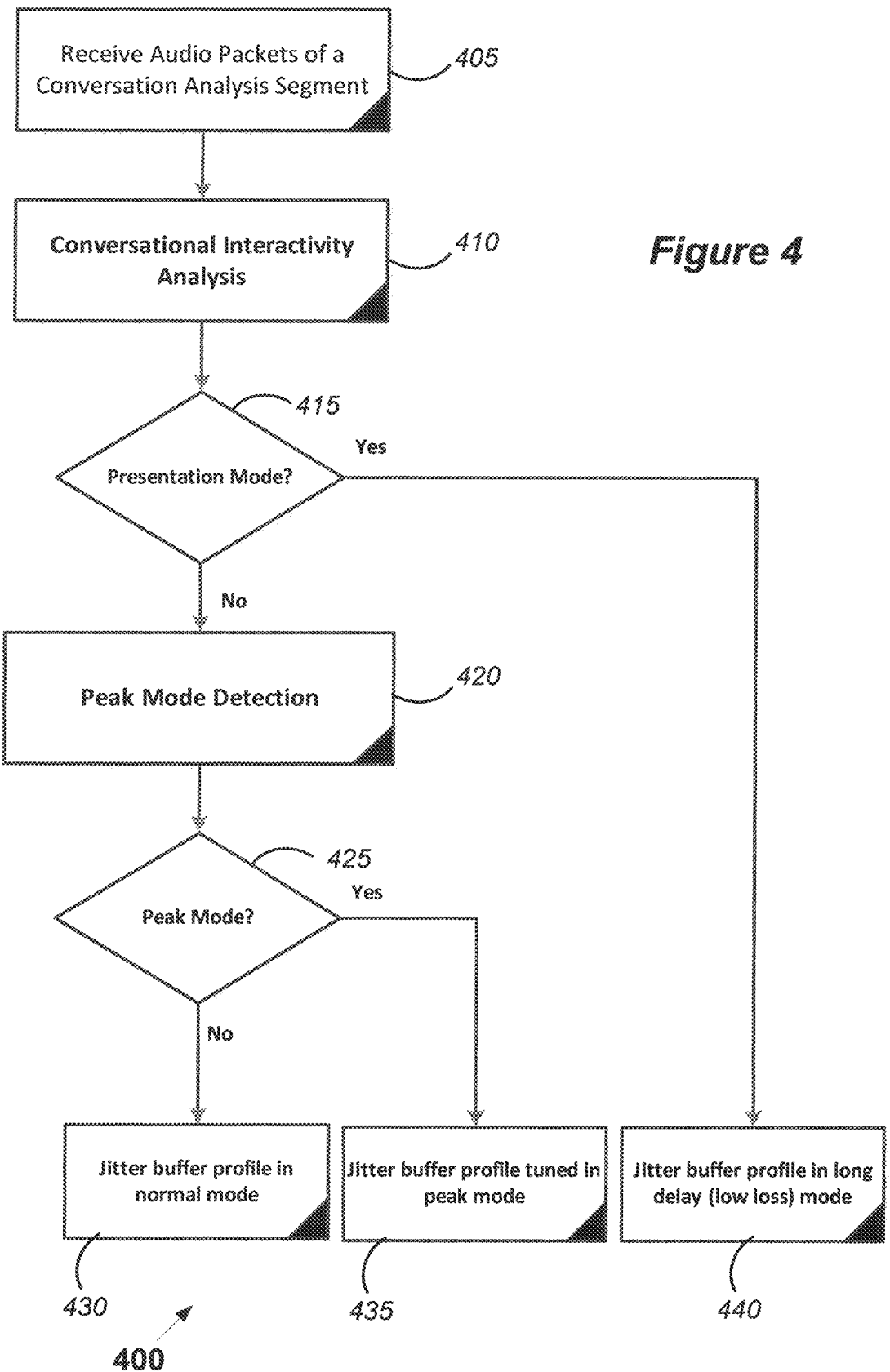
FIG. 4 is a flow diagram that illustrates blocks of some jitter butter control methods provided herein.

FIG. 4 is a flow diagram that illustrates blocks of some jitter butter control methods provided herein. Method 400 may, for example, be performed (at least in part) by a server or another such device that is configured for communicating with communication terminals, such as described above with reference to FIG. 1B. However, some methods provided herein may be performed (at least in part) by a communication terminal. As with other method described herein, the blocks of method 400 are not necessarily performed in the order indicated. Moreover, some implementations of method 400 may include more or fewer blocks than indicated or described.

Here, method 400 begins with block 405, which involves receiving audio packets of a conversation analysis segment. In block 410, a conversational interactivity analysis is performed, which may be a long-term conversational interactivity analysis. As used herein, a "long-term" time interval includes at least a plurality of talkspurts. If it is determined in block 415 that the conversational interactivity analysis indicates a presentation mode, the process continues to block 440, in which a long delay/low loss (relatively large) jitter buffer mode is determined. In this example, the long delay/low loss mode corresponds with a jitter buffer size, or at least with a jitter buffer size range. In this example, therefore, no peak mode detection is necessary for the jitter buffer size (or at least a jitter buffer size range) to be determined. However, the jitter buffer size may vary adaptively during a long delay/low loss mode. In some implementations, during a long delay/low loss mode the parameters that can control a tradeoff between packet loss rate and jitter buffer delay may be tuned to reduce packet loss at the cost of increasing the buffer delay.

However, if it is determined in block 415 that the conversational interactivity analysis does not indicate a presentation mode, the process continues to peak mode detection block 440, which involves analyzing the audio packets of the conversation analysis segment to determine network jitter dynamics data. In this example, block 425 involves determining whether a peak mode (corresponding to high network jitter) is present, based on the network jitter dynamics data determined in block 420.

If it is determined in block 425 that the network jitter dynamics data indicates a peak mode, the process continues to block 435, in which a peak mode jitter buffer size (or size range) is determined. The peak mode jitter buffer size may be a relatively large jitter buffer size. In some implementations, the peak mode jitter buffer size may be the same size as the long delay/low loss jitter buffer size corresponding to block 440, whereas in other implementations the peak mode jitter buffer size may be smaller than the jitter buffer size corresponding to block 440. However, the jitter buffer size may vary adaptively during a peak mode. In some implementations, during a peak mode the maximum talk-spurt start delay will be increased. In some examples, asymmetric "attack" and "decay" processes of jitter buffer control may be implemented during a peak mode. For example, in some peak mode implementations, an "attack" process of jitter buffer control can allow the jitter buffer size to increase quickly in response to instantaneous spike jitter. In some peak mode examples, the jitter buffer size may be controlled to reduce the packet loss rate when there is bursty arrival of delayed packets after a delay spike.

If it is determined in block 425 that the network jitter dynamics data does not indicate a peak mode, the process continues to block 430, in which a "normal mode" jitter buffer size (or size range) is determined. In this example, the "normal mode" jitter buffer size range is smaller than the peak mode jitter buffer size range and smaller than the long delay/low loss jitter buffer size range. However, the jitter buffer size may vary adaptively during a normal mode. For example, the jitter buffer size may vary adaptively according to methods known to those of skill in the art. Method 400 may be performed on an ongoing basis, such that additional audio packets may be received and analyzed after a jitter buffer size is determined in block 430, 435 or 440.

In some implementations, controlling the jitter buffer size may involve setting a jitter buffer size according to one of at least three jitter buffer control modes. Each of the jitter buffer control modes may correspond to a jitter buffer size (or size range). One example is shown in Table 1, below:

TABLE 1

| Algorithm Configurations | isPresentationMode | isPeakMode |
|---|---|---|
| Jitter buffer profile in long delay (low loss) mode | 1 | 1 |
| Jitter buffer profile in long delay (low loss) mode | 1 | 0 |
| Jitter buffer profile tuned in peak mode | 0 | 1 |
| Jitter buffer profile in normal mode | 0 | 0 |

In this example, the largest of the jitter buffer sizes (or size ranges) corresponds to network jitter dynamics data indicating more than a threshold amount of network jitter ("isPeakMode") and conversational interactivity data indicating less than a threshold amount of conversational interactivity ("isPresentationMode"). Here, a bit is set corresponding to "isPresentationMode" and a bit is set corresponding to "isPeakMode." In this implementation, the largest jitter buffer size corresponds with a long delay/low loss mode. In some implementations, this mode will be indicated when network jitter dynamics data indicates more than a threshold amount of network jitter and when conversational interactivity data indicates less than a threshold amount of conversational participation by a single conversational participant. In some examples, this mode will be indicated when network jitter dynamics data indicates more than a threshold amount of network jitter and when conversational interactivity data indicates less than a threshold amount of conversational participation by all but one conversational participant, or all but a threshold number of conversational participants. In some examples, the largest jitter buffer size may be in the range of hundreds of milliseconds, e.g., 500 ms, 600 ms, 700 ms, 800 ms, 900 ms, 1000 ms, 1100 ms, 1200 ms, 1300 ms, 1400 ms, 1500 ms, etc. In some implementations, the jitter buffer size may be fixed at the largest jitter buffer size until the network jitter dynamics data and/or the conversational interactivity data indicate a change. However, in other implementations, the jitter buffer size may vary adaptively within a size range, e.g., according to parameters for a long delay/low loss mode described above.

In this implementation, the largest or the second-largest of the jitter buffer sizes (or size ranges) corresponds to network jitter dynamics data indicating less than a threshold amount of network jitter and conversational interactivity data indicating at least a threshold amount of conversational interactivity. Here, "isPresentationMode" is set to one and "isPeakMode" is set to zero. In some implementations, this mode will be indicated when network jitter dynamics data indicates less than a threshold amount of network jitter and when conversational interactivity data indicates less than a threshold amount of conversational participation by a single conversational participant. In some examples, this mode will be indicated when network jitter dynamics data indicates less than a threshold amount of network jitter and when conversational interactivity data indicates less than a threshold amount of conversational participation by all but one conversational participant, or all but a threshold number of conversational participants. In this implementation, the largest jitter buffer size corresponds with a long delay/low loss mode, which involves the largest of at least three jitter buffer sizes (or size ranges). However, in alternative implementations, this condition may correspond with the second-largest of at least four jitter buffer sizes (or size ranges), or the larger of two jitter buffer sizes (or size ranges).

In this example, the second-smallest of the jitter buffer sizes corresponds to network jitter dynamics data indicating greater than a threshold amount of network jitter and conversational interactivity data indicating less than a threshold amount of conversational interactivity. Here, "isPresentationMode" is set to zero and "isPeakMode" is set to one. In some implementations, this mode will be indicated when network jitter dynamics data indicates more than a threshold amount of network jitter and when conversational interactivity data indicates more than a threshold amount of conversational participation by a single conversational participant. In some examples, this mode will be indicated when network jitter dynamics data indicates more than a threshold amount of network jitter and when conversational interactivity data indicates more than a threshold amount of conversational participation by a threshold number of conversational participants. In this example, the second-smallest of the jitter buffer sizes corresponds to a peak mode jitter buffer size. However, in some alternative implementations, the peak mode jitter buffer size may be the same size as the jitter buffer that corresponds with a long delay/low loss mode. As noted above, in some implementations the jitter buffer size may be variable during a peak mode. In some implementations, during a peak mode the maximum talk-spurt start delay will be increased.

In some examples, asymmetric "attack" and "decay" processes of jitter buffer control may be implemented during a peak mode. As used herein, the term "attack" may correspond with a response to a delay spike (e.g., by increasing the jitter buffer size) and "decay" may correspond with a non-attack process, such as a return to a lower jitter buffer size after an attack process. For example, applying asymmetrical smoothing parameters for attack and decay processes may involve applying an attack smoothing parameter if the PDV or IAT is greater than a current jitter buffer size. In some implementations, applying asymmetrical smoothing parameters for attack and decay processes may involve applying a decay smoothing parameter if the PDV or IAT is not greater than a current jitter buffer size. In some peak mode implementations, an "attack" process of jitter buffer control can allow the jitter buffer size to increase quickly in response to instantaneous spike jitter. The jitter buffer size may be controlled to reduce the packet loss rate when there is bursty arrival of delayed packets after a delay spike.

In this implementation, the smallest of the jitter buffer sizes corresponds to network jitter dynamics data indicating less than a threshold amount of network jitter and conversational interactivity data indicating less than a threshold amount of conversational interactivity. In some implementations, this mode will be indicated when network jitter dynamics data indicates less than a threshold amount of network jitter and when conversational interactivity data indicates more than a threshold amount of conversational participation by a single conversational participant. In some examples, this mode will be indicated when network jitter dynamics data indicates less than a threshold amount of network jitter and when conversational interactivity data indicates more than a threshold amount of conversational participation by a threshold number of conversational participants. Here, "isPresentationMode" is set to zero and "isPeakMode" is set to zero, indicating a "normal mode" of jitter buffer control and a corresponding normal mode jitter buffer size range. In this example, the normal mode jitter buffer size range is smaller than the peak mode jitter buffer size range and smaller than the long delay/low loss jitter buffer size range. In some implementations, the normal mode jitter buffer size range may be in the range of tens of milliseconds, e.g., 25 ms, 30 ms, 35 ms, 40 ms, 45 ms, 50 ms, 55 ms, etc. However, the jitter buffer size may vary adaptively during a normal mode. For example, the jitter buffer size may vary adaptively according to methods known to those of skill in the art.

Although various aspects of the current disclosure may be implemented in a device, such as a server, which may facilitate communications between multiple communication terminals, some aspects may be implemented (at least in part) in a single communication terminal. In some such examples, determining the conversational interactivity data may involve analyzing the conversational activity of only a single conversational participant. Because such implementations may involve analyzing the conversational activity of a conversational participant who is using a particular communication terminal, the single conversational participant may be referred to as a "local" or "near-end" conversational participant.

In some such implementations, analyzing the conversational activity of the single conversational participant may involve determining whether the single conversational participant is talking or not talking. Controlling the jitter buffer size may involve setting the jitter buffer to a relatively smaller size (or size range) when the single conversational participant is talking and setting the jitter buffer to a relatively larger size (or size range) when the single conversational participant is not talking.

Setting the jitter buffer to a relatively smaller size (or size range) when the near-end conversational participant is talking can allow other "far-end" conversational participants to interrupt and/or respond to the near-end conversational participant quickly. When the near-end conversational participant is not talking, this condition indicates that another conversational participant is likely to be taking or that there is a mutual silent time. In such conditions, the jitter buffer length of the near-end conversational participant can be set to a relatively larger size (or size range), because a longer delay may be acceptable.

According to some such embodiments, statistics of the talk-spurt length distribution of the near-end conversational participant may be used to control the jitter buffer algorithm. For example, if the talk-spurts of the near-end conversational participant tend to be relatively long, this may indicate that the near-end conversational participant is giving a presentation.

Figure 5:
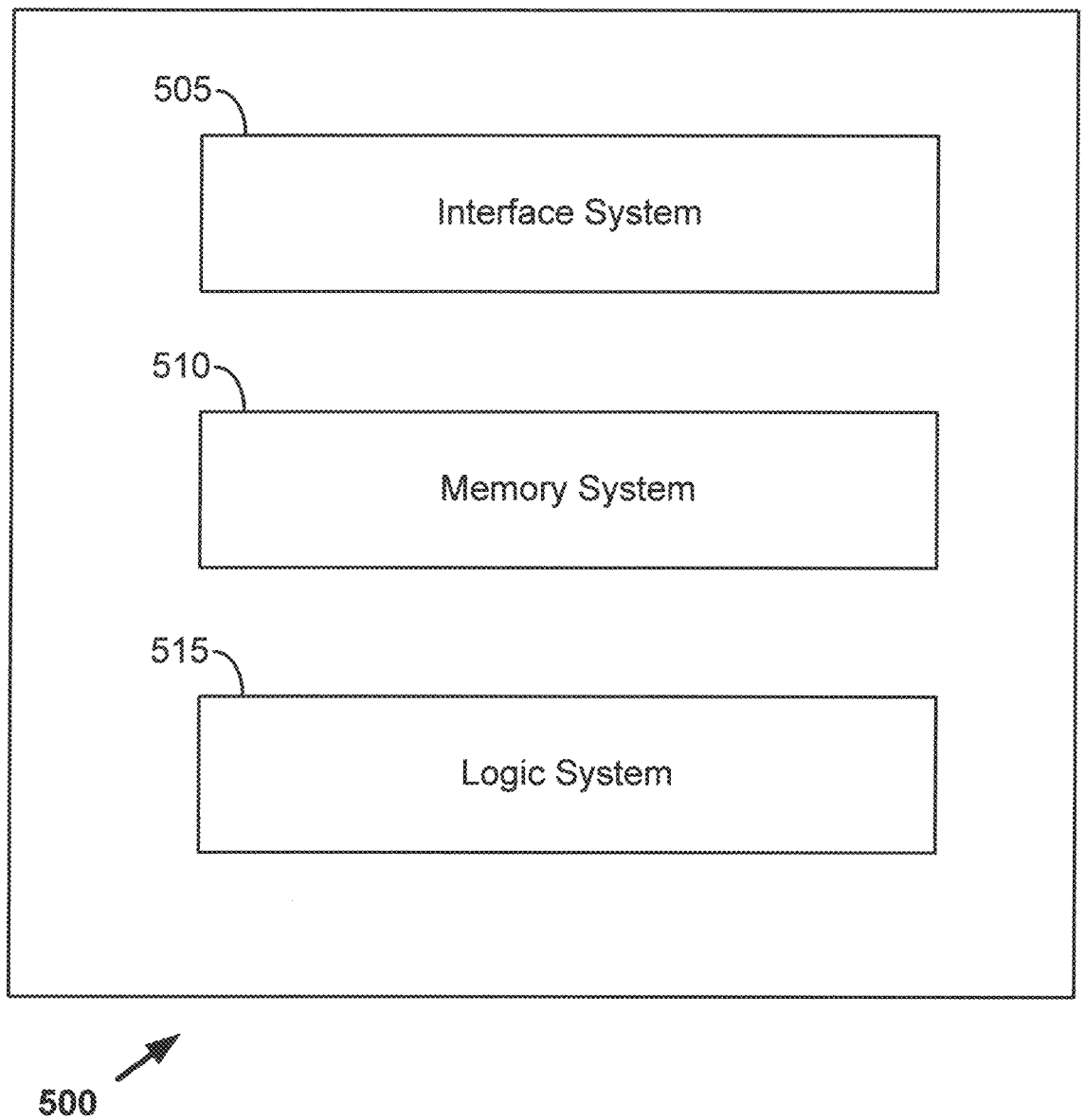
FIG. 5 is a block diagram that provides examples of components of an apparatus capable of implementing various aspects of this disclosure.

FIG. 5 is a block diagram that provides examples of components of an apparatus capable of implementing various aspects of this disclosure. The apparatus 500 may, for example, be (or may be a portion of) a communication terminal, a server, etc. In some examples, the apparatus may be implemented in a component of another device. For example, in some implementations the apparatus 500 may be a line card.

In this example, the apparatus 500 includes an interface system 505, a memory system 510 and a logic system 515. The logic system 515 and/or the memory system 510 may be capable of establishing one or more jitter buffers in the memory system 510. The interface system 505 may include a network interface, an interface between the logic system and the memory system and/or an external device interface (such as a universal serial bus (USB) interface). The logic system 515 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In this example, the logic system 515 is capable of receiving audio data via the interface system. The audio data may include audio packets received at actual packet arrival times during a time interval that corresponds with a conversation analysis segment. The time interval may be a long-term time interval that includes a plurality of talk-spurts. The logic system 515 may be capable of analyzing the audio data to determine network jitter dynamics data and conversational interactivity data and of controlling a jitter buffer size according to the network jitter dynamics data and the conversational interactivity data.

Analyzing the audio data to determine the network jitter dynamics data may involve determining at least one of packet delay variation (PDV) or inter-arrival time (IAT) variation by comparing expected packet arrival times with the actual packet arrival times. Analyzing the audio data to determine the network jitter dynamics data may involve determining at least one of a delay spike presence probability or a delay spike intensity.

Analyzing the audio data to determine the conversational interactivity data involves determining single-talk times, double-talk times and mutual silent times. In some implementations, analyzing the audio data to determine the conversational interactivity data may involve determining a conversational interactivity measure (CIM) based on heuristic rules and/or conversational relative entropy.

Figure 6:
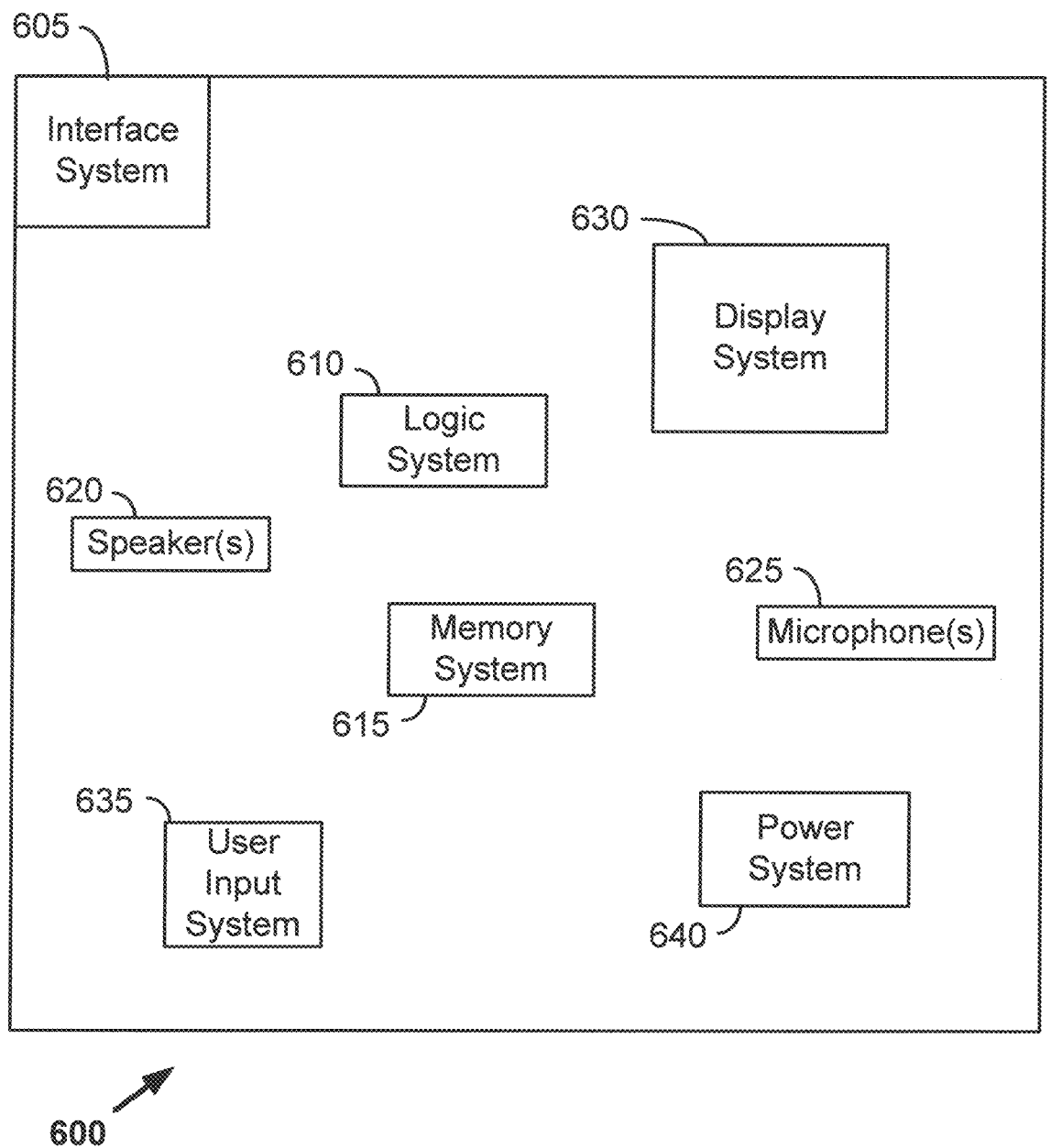
FIG. 6 is a block diagram that provides examples of components of an audio processing apparatus.

FIG. 6 is a block diagram that provides examples of components of an audio processing apparatus. In this example, the device 600 includes an interface system 605. The interface system 605 may include a network interface, such as a wireless network interface. Alternatively, or additionally, the interface system 605 may include a universal serial bus (USB) interface or another such interface.

The device 600 includes a logic system 610. The logic system 610 may include a processor, such as a general purpose single- or multi-chip processor. The logic system 610 may include a digital signal processor (DSP), an application specific integrated circuit (ASIC), a field programmable gate array (FPGA) or other programmable logic device, discrete gate or transistor logic, or discrete hardware components, or combinations thereof. The logic system 610 may be configured to control the other components of the device 600. For example, the logic system 610 may be capable of controlling a size of one or more jitter buffers in the memory system 615. Although no interfaces between the components of the device 600 are shown in FIG. 6, the logic system 610 may be configured with interfaces for communication with the other components. The other components may or may not be configured for communication with one another, as appropriate.

The logic system 610 may be configured to perform audio data analysis and jitter buffer control functionality, including but not limited to the functionality described herein. In some such implementations, the logic system 610 may be configured to operate (at least in part) according to software stored one or more non-transitory media. The non-transitory media may include memory associated with the logic system 610, such as random access memory (RAM) and/or read-only memory (ROM). The non-transitory media may include memory of the memory system 615. The memory system 615 may include one or more suitable types of non-transitory storage media, such as flash memory, a hard drive, etc.

The logic system 610 may be configured to receive frames of encoded audio data via the interface system 605 and to decode the encoded audio data. Alternatively, or additionally, the logic system 610 may be configured to receive frames of encoded audio data via an interface between the memory system 615 and the logic system 610. The logic system 610 may be configured to control the speaker(s) 620 according to decoded audio data.

The display system 630 may include one or more suitable types of display, depending on the manifestation of the device 600. For example, the display system 630 may include a liquid crystal display, a plasma display, a bistable display, etc.

The user input system 635 may include one or more devices configured to accept input from a user. In some implementations, the user input system 635 may include a touch screen that overlays a display of the display system 630. The user input system 635 may include a mouse, a track ball, a gesture detection system, a joystick, one or more GUIs and/or menus presented on the display system 630, buttons, a keyboard, switches, etc. In some implementations, the user input system 635 may include the microphone 625: a user may provide voice commands for the device 600 via the microphone 625. The logic system may be configured for speech recognition and for controlling at least some operations of the device 600 according to such voice commands.

The power system 640 may include one or more suitable energy storage devices, such as a nickel-cadmium battery or a lithium-ion battery. The power system 640 may be configured to receive power from an electrical outlet.

Various modifications to the implementations described in this disclosure may be readily apparent to those having ordinary skill in the art. The general principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

We claim:

1. A method, comprising:
receiving audio data packets;
extracting audio data frames from the audio data packets, the audio data frames corresponding to a time interval within a conversation analysis segment that includes a plurality of talkspurts, wherein a talkspurt is a segment of speech between mutual silent times of a conversation and wherein a mutual silent time is a time during which no conversational participant is speaking;
analyzing the audio data frames to determine network jitter dynamics data and conversational interactivity data, wherein the network jitter dynamics data provides an indication of jitter in a network that relays the audio data packets, and wherein determining the conversational interactivity data comprises analyzing the conversational activity of only a single conversational participant to determine whether the single conversational participant is talking or not talking, wherein analyzing the audio data frames involves determining percentile ranges of packet delay times according to order statistics of packet delay variation, the percentile ranges of packet delay times including shortest packet delay times, median packet delay times and longest packet delay times, and wherein determining the network jitter dynamics data involves determining an inter-percentile range of packet delay corresponding to a difference between one of the longest packet delay times and one of the median packet delay times; and
controlling a jitter buffer size by selecting one of a plurality of jitter buffer control modes in response to both the network jitter dynamics data and the conversational interactivity data.

2. The method of claim 1, wherein analyzing the audio data frames to determine the network jitter dynamics data involves determining at least one of packet delay variation (PDV) or inter-arrival time (IAT) variation based, at least in part, on actual packet arrival times, wherein determining PDV involves comparing expected packet arrival times with the actual packet arrival times.

3. The method of claim 1, wherein analyzing the audio data frames to determine the conversational interactivity data involves one or more of determining single-talk times during which only a single conversational participant is speaking, determining double-talk times during which two or more conversational participants are speaking, and determining mutual silent times during which no conversational participant is speaking.

4. The method of claim 1, wherein controlling the jitter buffer size involves setting the jitter buffer to a relatively smaller size when the single conversational participant is talking and setting the jitter buffer to a relatively larger size when the single conversational participant is not talking.

5. The method of claim 1, wherein controlling the jitter buffer size involves setting a jitter buffer to a relatively larger size when the network jitter dynamics data indicates more than a threshold amount of network jitter.

6. The method of claim 1, wherein controlling the jitter buffer size involves setting a jitter buffer for the single conversational participant to a relatively larger size when the network jitter dynamics data indicates more than a threshold amount of network jitter or when the conversational interactivity data indicates less than a threshold amount of conversational participation by the single conversational participant.

7. The method of claim 1, wherein controlling the jitter buffer size involves setting a jitter buffer to a relatively smaller size when the network jitter dynamics data indicates less than a threshold amount of network jitter or when the conversational interactivity data indicates at least a threshold amount of conversational interactivity.

8. The method of claim 1, wherein controlling the jitter buffer size involves setting a jitter buffer for the single conversational participant to a relatively smaller size when the network jitter dynamics data indicates less than a threshold amount of network jitter or when the conversational interactivity data indicates at least a threshold amount of conversational participation by the single conversational participant.

9. The method of claim 1, wherein controlling the jitter buffer size involves setting a jitter buffer size according to one of at least three jitter buffer control modes.

10. The method of claim 9, wherein the jitter buffer control modes include a peak mode, a low-loss mode and a normal mode and each jitter buffer control mode corresponds to a jitter buffer size and a range of jitter buffer sizes.

11. The method of claim 9, wherein one of the jitter buffer control modes corresponds to network jitter dynamics data indicating at least a threshold amount of network jitter and conversational interactivity data indicating at least a threshold amount of conversational interactivity.

12. The method of claim 9, wherein one of the jitter buffer control modes corresponds to network jitter dynamics data indicating at least a threshold amount of network jitter and conversational interactivity data indicating less than a threshold amount of conversational interactivity.

13. The method of claim 9, wherein one of the jitter buffer control modes corresponds to network jitter dynamics data indicating less than a threshold amount of network jitter and conversational interactivity data indicating at least a threshold amount of conversational interactivity.

14. The method of claim 9, wherein one of the jitter buffer control modes corresponds to network jitter dynamics data indicating less than a threshold amount of network jitter and conversational interactivity data indicating less than a threshold amount of conversational interactivity.

15. An apparatus comprising one or more processing devices configured to:
receive audio data packets;
extract audio data frames from the audio data packets, the audio data frames corresponding to a time interval within a conversation analysis segment that includes a plurality of talkspurts, wherein a talkspurt is a segment of speech between mutual silent times of a conversation and wherein a mutual silent time is a time during which no conversational participant is speaking;
analyze the audio data frames to determine network jitter dynamics data and conversational interactivity data, wherein analyzing the audio data frames involves determining percentile ranges of packet delay times according to order statistics of packet delay variation, the percentile ranges of packet delay times including shortest packet delay times, median packet delay times and longest packet delay times, wherein the network jitter dynamics data provides an indication of jitter in a network that relays the audio data packets, wherein determining the network jitter dynamics data involves determining an inter-percentile range of packet delay corresponding to a difference between one of the longest packet delay times and one of the median packet delay times and wherein determining the conversational interactivity data comprises analyzing the conversational activity of only a single conversational participant to determine whether the single conversational participant is talking or not talking; and
control a jitter buffer size by selecting one of a plurality of jitter buffer control modes in response to both the network jitter dynamics data and the conversational interactivity data.

16. A non-transitory medium having software stored thereon, the software including instructions which, when executed by one or more processing devices, cause the one or more processing devices to perform a method, comprising:
receiving audio data packets;
extracting audio data frames from the audio data packets, the audio data frames corresponding to a time interval within a conversation analysis segment that includes a plurality of talkspurts, wherein a talkspurt is a segment of speech between mutual silent times of a conversation and wherein a mutual silent time is a time during which no conversational participant is speaking;
analyzing the audio data frames to determine network jitter dynamics data and conversational interactivity data, wherein analyzing the audio data frames involves determining percentile ranges of packet delay times according to order statistics of packet delay variation, the percentile ranges of packet delay times including shortest packet delay times, median packet delay times and longest packet delay times, wherein the network jitter dynamics data provides an indication of jitter in a network that relays the audio data packets, wherein determining the network jitter dynamics data involves determining an inter-percentile range of packet delay corresponding to a difference between one of the longest packet delay times and one of the median packet delay times and wherein determining the conversational interactivity data comprises analyzing the conversational activity of only a single conversational participant to determine whether the single conversational participant is talking or not talking; and
controlling a jitter buffer size by selecting one of a plurality of jitter buffer control modes in response to both the network jitter dynamics data and the conversational interactivity data.

* * * * *